Oct. 25, 1932. W. C. SCHULTS ET AL 1,884,290
PICTURE FRAME
Filed Feb. 25, 1932
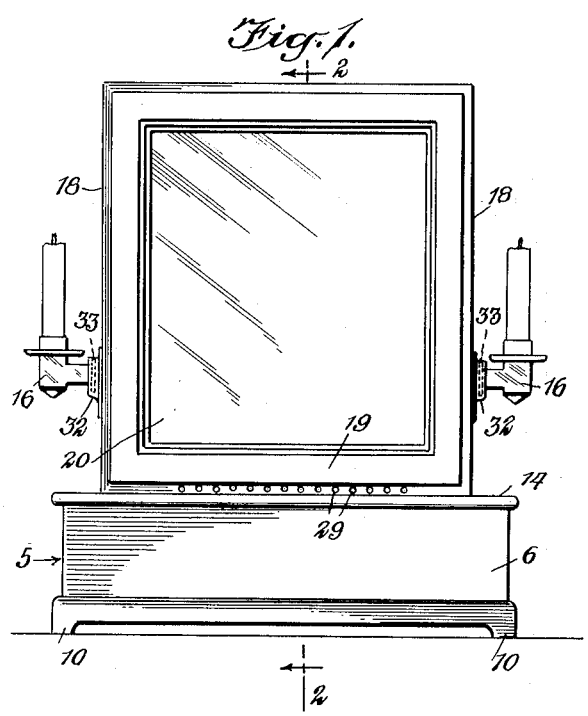
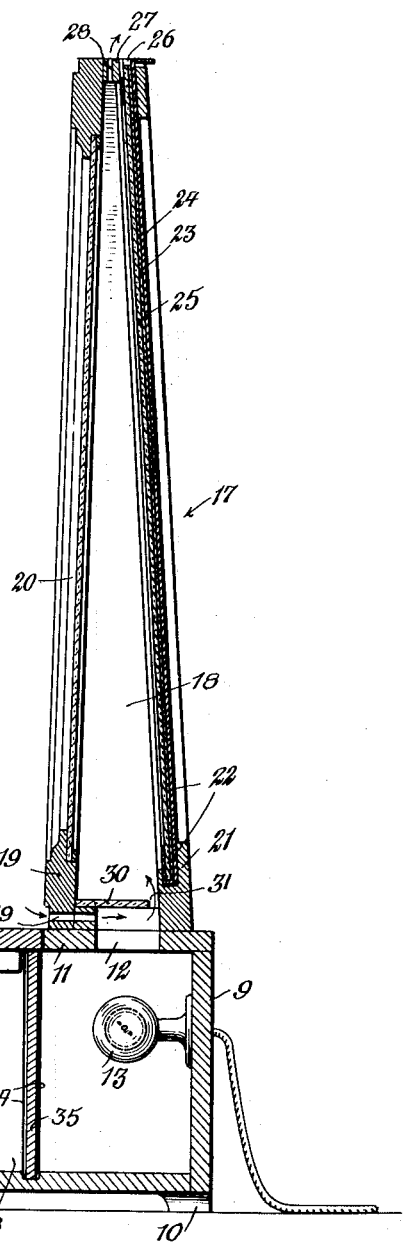
INVENTORS
William C. Schults
Max Holzer
BY Munn & Co.
ATTORNEYS Patented Oct. 25, 1932

1,884,290

UNITED STATES PATENT OFFICE

WILLIAM C. SCHULTS AND MAX HOLZER, OF BROOKLYN, NEW YORK, ASSIGNORS OF ONE-THIRD TO CHARLES NEWMAN, OF BROOKLYN, NEW YORK

PICTURE FRAME

Application filed February 25, 1932. Serial No. 595,173.

An object of the invention is to provide a frame for exhibiting and illuminating religious and other pictures, and to provide means to prevent the frame from becoming heated by the illuminating means.

The invention also comprehends a frame, the front and the rear of which are spaced apart, there being a guideway at the rear of the frame in which a picture may be disposed, and there being a transparent member at the front of the frame, the picture being illuminated by a lamp below the frame and there being outlet openings at the top of the frame and inlet openings at the bottom of the frame to permit a column of cooling air to pass upwardly between the transparent member and the picture.

Other objects of the invention are to dispose the transparent member and the picture converging upwardly, and to provide a translucent member above the inlet openings to direct air from the inlets horizontally above the lamp, and then upwardly between the front and rear members of the frame and out of the outlets at the top of the frame.

Additional objects of the invention will appear in the following specification in which the preferred form of the invention is described.

In the drawing similar reference characters refer to similar parts in both views, of which Figure 1 is a front elevation showing the invention, and Figure 2 is an enlarged sectional view on the line 2—2 of Figure 1.

By referring to the drawing, it will be seen that a base 5 is provided having a front wall 6, a bottom member 7, sides 8 and a rear wall 9, the bottom member 7 being supported on legs 10 which permits of the circulation of air between the support and the bottom member 7. The rear of the top of the base 5 is closed by a top member 11 having an aperture 12 from which light rays may pass from a lamp 13, which is disposed in the opening in the base and is preferably secured to the rear wall 9 of the base 5. The top of the forward portion of the base 5 is closed by a lid 14 having depending portions 15 which engage the inner surfaces of the side walls 8 of the base.

It will be seen that the lid 14 may be removed to permit of the replacement of the lamp 13, as may be desired, and that the base 5 at the front of the lamp 13 may be used to store various articles, including the candlesticks 16 which are normally mounted at the sides of the frame which is mounted on the base 5.

The frame 17 has sides 18 connecting a front member 19 having a transparent member 20 and a rear member 21 having guideways 22 at its sides and bottom, in which a picture may be disposed. It will be seen, by referring to Figure 2 of the drawing, that the front member 19 and the rear member 21 converge upwardly and that the picture 23 may be mounted on a back 24 and may be covered with a glass or other transparent member 25, the said glass, the picture 23 and the back 24 being secured together and being introduced in the guideways 22 at the opening 26 at the top of the rear member 21. It will also be seen by referring to Figure 2, that the front member 19 and the rear member 21 are spaced apart at the top by a member 27 which has an outlet opening or openings 28. At the bottom of the front member 19 there are inlet openings 29, the outlet openings 28 extending vertically and the inlet openings 29 extending horizontally, there being a translucent member 30 above the inlet openings 29, this translucent member 30 preferably extending from the front member 19 to a point adjacent the rear member 21 but leaving an opening 31 between the translucent member 30 and the rear member 21.

It will be seen that, when the lamp is lit and a picture is disposed with its back and the glass in the guideways 22, air will pass through the inlets 29 below the translucent member 30, upwardly through the opening 31, through the opening between the front member 19 and the rear member 21 and out of the outlet openings 28. Therefore, cooling air will pass continuously across the top of the aperture 12 and upwardly through the space between the front and rear members 19 and 21 and between the transparent member 20 and the picture to keep the frame, the glass and the picture cool, although the lamp will create considerable heat. It will also be seen that, inasmuch as the legs raise the base above the table on which the base may be disposed, cooling air will pass below the bottom of the base, as well as around the base and between the frame members.

As will be seen by referring to Figure 1 of the drawing, the sides 18 of the frame members have brackets 32 with guideways 33 extending downwardly through the top of the brackets, so that candlesticks 16 having guides fitting the guideways 33 may be disposed in the said guideways, so that they may be removably mounted at the sides 18 of the frame 17.

In the base 5 there are guides 34 in which is disposed a removable partition 35.

What is claimed is:

1. In a picture frame, a base, a frame disposed on the base and having a transparent front member and a rear member spaced therefrom, the rear member having guideways for a picture, a lamp in the base for directing light rays between the front and the rear members, a horizontal translucent member at the bottom of the frame for partially closing the bottom of the frame, the frame having an outlet opening or openings at its top, and an inlet opening or openings below the translucent member.

2. In a picture frame, a base having an opening and a top with an aperture leading from the opening, a lamp in the base for directing light rays through the opening, a frame mounted on the base over the aperture and having spaced apart a front transparent member and a rear member having guideways for a picture, a horizontal translucent member at the bottom of the frame partially closing the bottom of the frame, the frame having an inlet opening or openings below the translucent member through which air may pass under the translucent member and to the space between the front and rear members of the frame, and the frame also having an outlet opening or openings at the top of the frame between the front and rear members.

3. In a picture frame, a base having an opening and a top with an aperture leading from the opening, a lamp in the base for directing light rays through the opening, a frame mounted on the base over the aperture and having upwardly converging front and rear members, a horizontal translucent member at the bottom of the frame partially closing the bottom of the frame, the frame having an inlet opening or openings below the translucent member through which air may pass under the translucent member and to the space between the front and rear members of the frame, and the frame also having an outlet opening or openings at the top of the frame between the front and rear members.

4. In a picture frame, a base having an opening and a top member disposed over a portion of the opening, a lid disposed over the remainder of the opening, the top member having an aperture, a lamp in the opening in the base for directing light rays through the aperture, a frame mounted on the base over the aperture and having spaced apart a front transparent member and a rear member having guideways for a picture, a horizontal translucent member at the bottom of the frame, the frame having an inlet opening or openings below the translucent member through which air may pass under the translucent member and to the space between the front and rear members of the frame, and the frame also having an outlet opening or openings at the top of the frame between the front and rear members.

5. In a picture frame, a base having an opening and a top member disposed over a portion of the opening, a lid disposed over the remainder of the opening, the top member having an aperture, a lamp in the opening in the base for directing light rays through the aperture, a frame mounted on the base over the aperture and having spaced apart a front translucent member and a rear member having guideways for a picture, a horizontal translucent member at the bottom of the frame, the frame having an inlet opening or openings below the translucent member through which air may pass under the translucent member and to the space between the front and rear members of the frame, and the frame also having an outlet opening or openings at the top of the frame between the front and rear members, and legs for the base to permit air to circulate under the base.

6. In a picture frame, a base having an opening and a top member disposed over a portion of the opening, a lid disposed over the remainder of the opening, the top member having an aperture, a lamp in the opening in the base for directing light rays through the aperture, a frame mounted on the base over the aperture and having spaced apart a front transparent member and a rear member having guideways for a picture, a horizontal translucent member at the bottom of the frame, the frame having an inlet opening or openings below the translucent member through which air may pass under the translucent member and to the space between the front and rear members of the frame, and the frame also having an outlet opening or openings at the top of the frame between the front and rear members, guideways at the outer sides of the frame, and candlesticks having guides normally disposed in the guideways.

7. In a picture frame, a base having an opening and a top member disposed over a portion of the opening, a lid disposed over the remainder of the opening, the top member having an aperture, a lamp in the opening in the base for directing light rays through the aperture, a frame mounted on the base over the aperture and having spaced apart a front transparent member and a rear member having guideways for a picture, a horizontal translucent member at the bottom of the frame, the frame having an inlet opening or openings below the translucent member through which air may pass under the translucent member and to the space between the front and rear members of the frame, and the frame also having an outlet opening or openings at the top of the frame between the front and rear members, guideways at the outer sides of the frame, candlesticks having guides normally disposed in the guideways, guides at the inner sides of the base, and a removable partition in the guides.

8. In a picture frame, a base, a frame disposed on the base and having a transparent front member and a rear member spaced therefrom, a lamp in the base for directing light rays between the front and rear members, a horizontal translucent member at the bottom of the frame for partially closing the bottom of the frame, the frame having an outlet opening or openings at its top, and an inlet opening or openings below the translucent member.

9. In a picture frame, a base having an opening and a top with an aperture leading from the opening, a lamp in the base for directing light rays through the aperture, a frame mounted on the base over the aperture and having spaced apart a front transparent member and a rear member, a horizontal translucent member at the bottom of the frame partially closing the bottom of the frame, the frame having an inlet opening or openings below the translucent member through which air may pass under the translucent member and to the space between the front and rear members of the frame, and the frame also having an outlet opening or openings at the top of the frame between the front and rear members.

10. In a picture frame, a frame having a transparent front member and a rear member spaced therefrom, a lamp disposed for directing light rays between the front and rear members, a horizontally extending member at the bottom of the frame for partially closing the bottom of the frame, the frame having an outlet opening or openings adjacent its top and an inlet opening or openings below the horizontally extending member.

WILLIAM C. SCHULTS.
MAX HOLZER.